US011646418B2

(12) United States Patent
Wang et al.

(10) Patent No.: US 11,646,418 B2
(45) Date of Patent: May 9, 2023

(54) FREE-STANDING MOF-DERIVED HYBRID POROUS CARBON NANOFIBER MATS

(71) Applicant: Agency for Science, Technology and Research, Singapore (SG)

(72) Inventors: Suxi Wang, Singapore (SG); Xu Li, Singapore (SG); Andy Hor, Singapore (SG); Zhongxing Zhang, Singapore (SG); Kia Jia Benny Chew, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 65 days.

(21) Appl. No.: 17/223,347

(22) Filed: Apr. 6, 2021

(65) Prior Publication Data
US 2021/0296648 A1  Sep. 23, 2021

Related U.S. Application Data

(63) Continuation of application No. 16/069,707, filed as application No. PCT/SG2017/050022 on Jan. 16, 2017, now Pat. No. 10,998,550.

(30) Foreign Application Priority Data

Jan. 14, 2016  (SG) .......................... 10201600299S

(51) Int. Cl.
| *H01M 4/587* | (2010.01) |
| *D01D 5/00* | (2006.01) |
| *D01F 1/10* | (2006.01) |
| *D01F 9/22* | (2006.01) |
| *B82Y 30/00* | (2011.01) |
| *D04H 3/002* | (2012.01) |
| *D04H 3/03* | (2012.01) |
| *H01M 10/0525* | (2010.01) |
| *H01M 4/62* | (2006.01) |
| *H01M 4/02* | (2006.01) |

(52) U.S. Cl.
CPC ............. *H01M 4/587* (2013.01); *B82Y 30/00* (2013.01); *D01D 5/003* (2013.01); *D01F 1/10* (2013.01); *D01F 9/22* (2013.01); *D04H 3/002* (2013.01); *D04H 3/03* (2013.01); *H01M 10/0525* (2013.01); *D10B 2101/12* (2013.01); *D10B 2321/10* (2013.01); *D10B 2401/16* (2013.01); *H01M 4/625* (2013.01); *H01M 2004/027* (2013.01)

(58) Field of Classification Search
CPC ........ B01J 21/185; B01J 23/06; B01J 23/745; B01J 23/75; B01J 23/80; H01M 4/587; H01M 10/0525; H01M 4/625; H01M 2004/027; D10B 2101/12; D10B 2321/10; D10B 2410/16; D10B 2321/121; D01D 5/003; D01F 1/10; D01F 9/22; D04H 3/002; D04H 3/03

USPC ......... 502/183, 185, 300; 977/700, 742, 748
See application file for complete search history.

(56) References Cited

U.S. PATENT DOCUMENTS

| 11,033,888 | B2 * | 6/2021 | Liu ........................ B01J 37/084 |
| 2008/0176740 | A1 * | 7/2008 | Ma ........................ C07C 209/36 502/185 |
| 2010/0092865 | A1 | 4/2010 | Kanno et al. |
| 2011/0144365 | A1 * | 6/2011 | Park ..................... C01B 35/1009 556/9 |
| 2011/0171565 | A1 | 7/2011 | Birkan et al. |
| 2012/0189877 | A1 | 7/2012 | Ferraris et al. |
| 2014/0093790 | A1 | 4/2014 | Liu et al. |
| 2015/0207152 | A1 * | 7/2015 | Kim ..................... H01M 4/9041 429/485 |
| 2019/0060888 | A1 | 2/2019 | Liu et al. |

FOREIGN PATENT DOCUMENTS

| CN | 101098991 | A | * | 1/2008 | .............. B01J 35/06 |
| CN | 104418315 | A | | 3/2015 | |
| CN | 104857945 | A | * | 8/2015 | ............. Y02E 60/13 |
| CN | 105854853 | A | | 8/2016 | |
| CN | 106835362 | A | | 6/2017 | |
| WO | 2012131483 | A1 | | 10/2012 | |
| WO | 2013076742 | | | 5/2013 | |
| WO | 2013177199 | A1 | | 11/2013 | |
| WO | 2015183831 | A1 | | 12/2015 | |

OTHER PUBLICATIONS

Nataraj et al., "Free Standing Thin Webs of Porous Carbon Nanofibers of Polyacrylonitrile Containing Iron-Oxide by Electrospinning," Materials Letters, vol. 63, No. 2, Oct. 11, 2008, pp. 218-220.
Wu et al., "Electrospun Fibrous Mats as Skeletons to Produce Free-Standing MOF Membranes," Journal of Materials Chemistry, vol. 22, 2012, p. 16971-16978.
Shui et al., "Highly Efficient Nonprecious Metal Catalyst Prepared with Metal-Organic Framework in a Continuous Carbon Nanofibrous Network," PNAS, vol. 112, No. 34, Aug. 25, 2015, pp. 10629-10634.

(Continued)

*Primary Examiner* — Patricia L. Hailey
(74) *Attorney, Agent, or Firm* — Shackelford, Bowen, McKinley & Norton, LLP

(57) ABSTRACT

According to the present disclosure, a method of fabricating a metal-carbon fibrous structure is provided. The method comprises the steps of: (a) forming a fibrous support structure comprising composite nanocrystals and polymeric fibers, wherein each of the composite nanocrystals comprises metal ions connected by organic ligands; (b) growing the composite nanocrystals on the fibrous support structure; and (c) subjecting the fibrous support structure of step (b) to carbonization to form the metal-carbon fibrous structure, wherein the metal-carbon fibrous structure comprises metal nanoparticles derived from the composite nanocrystals. A metal-carbon fibrous structure comprising carbon based fibers arranged to form a porous network and the carbon based fibers are doped with metal nanoparticles, wherein the carbon based fibers have surfaces which comprise graphitic carbon, is also disclosed herein.

8 Claims, 11 Drawing Sheets

(56) References Cited

OTHER PUBLICATIONS

Wang et al., "Electrospun Nanofibrous Sorbents and Membranes for Carbon Dioxide Capture," Chapter 10 of Electrospun Nanofibrous Sorbents and Membranes for Carbon Dioxide Capture, 2014, pp. 249-263.
Fan et al., "Electrospinning Technology Applied in Zeolitic Imidazolate Framework Membrane Synthesis,"Jouranl of Materials Chemistry, vol. 22, 2012, pp. 25272-25276.
Ostermann et al., "Metal-Organic Framework Nanofibers via Electrospinning," Chem. Commun., vol. 47, 2011, pp. 442-444.
Li et al., "Mesoporous Nanostructured Co3O4 Derived from MOF Template: A High-Performance Anode Material for Lithium-Ion Batteries," Journal of Materials Chemistry A, vol. 3, 2015, pp. 5585-5591.
Abouali et al., "Co3O4/Porous Electrospun Carbon Nanofibers as Anodes for High Performance Li-ion Batteries," Journal of Materials Chemistry A, vol. 2, 2014, pp. 16939-16944.
Zhang et al., "Nanowire-Directed Templating Synthesis of Metal-Organic Framework Nanofibers and Their Derived Porous Doped Carbon Nanofibers for Enhanced Electrocatalysis," Journal of the American Chemical Society, vol. 136, 2014, pp. 14385-14388.
Zhang et al., "High-Performance and Ultra-Stable Lithium-Ion Batteries Based on MOF-Derived ZnO@ZnO Quantum Dots/C Core-Shell Nanorod Arrays on a Carbon Cloth Anode," Advanced Materials, vol. 27, 2015, pp. 2400-2405.
Wang et al., "Large-Scale Synthesis of Ordered Mesoporous Carbon Fiber and its Application as Cathode Material for Lithium-Sulfur Batteries," Carbon, vol. 81, 2015, pp. 782-787.
Park et al., "Electrospun Activated Carbon Nanofibers with Hollow Core/Highly Mesoporous Shell Structure as Counter Electrodes for Dye-Sensitized Solar Cells," Journal of Power Sources, vol. 239, 2013, pp. 122-127.
Wang et al., "Bioinspired Synthesis of Hierarchical Porous Graphitic Carbon Spheres with Outstanding High-Rate Performance in Lithium-Ion Batteries," Chemistry of Materials, vol. 27, 2015, pp. 336-342.
Written Opinion of the International Searching Authority for International Application No. PCT/SG2017/050022 dated Apr. 17, 2017, pp. 1-8.
International Preliminary Report on Patentability issued by the International Bureau of WIPO for International Application No. PCT/SG2017/050022 dated Jul. 17, 2018, pp. 1-10.
Song et al., "Self-Standing Binder-Free Electrospun Co3O4/carbon nanofiber Composites for Non-Aqueous Li-Air Batteries," Electrochimica Acta, vol. 182, 2015, pp. 289-296.
Yue et al., "Multi-Wall Carbon Nanotube@zeolite Imidazolate Framework Composite from a Nanoscale Zinc Oxide Precursor," Microporous and Mesoporous Materials, vol. 198, 2014, pp. 139-143.
Wei et al., "A Novel Cobalt-Carbon Composite for the Electrochemical Supercapacitor Electrode Material," Materials Letters, vol. 146, 2015, pp. 20-22.
Wang et al., "Metal-Organic Framework as a Host for Synthesis of Nanoscale Co3O4 as an Active Catalyst for CO Oxidation," Catalysis Communications, vol. 12, 2011, pp. 875-879.

\* cited by examiner

FREE-STANDING MOF-DERIVED HYBRID POROUS CARBON NANOFIBER MATS

TECHNICAL FIELD

The present disclosure relates to a method of fabricating a metal-carbon fibrous structure and the metal-carbon fibrous structure.

BACKGROUND

Nanoporous carbon materials (NPC) with a high specific surface area, narrow pore-size distribution, good thermal and chemical resistance have been considered promising materials for a wide range of applications such as adsorption, separation, sensing, energy storage and conversion etc. To date, efforts have been made in the preparation of NPC materials with various pore structures using "hard" or "soft" templating methods. These methods, however, tend to suffer from either tedious and costly fabrication process or insufficient thermal stability that may cause decomposition before the carbonization process completes.

Besides construction of porous structure, it may be more interesting to explore the possibility of enhancing and/or extending their properties by incorporating well-dispersed functional nanoparticles in the NPC matrix through either a direct-synthesis approach or a post-loading approach. However, in many instances, the nanoparticles tend to be randomly dispersed and/or severely aggregated to form undesirable large particles. Thus, it becomes challenging to introduce uniformly dispersed crystalline nanoparticles with a high metal content into the nanoporous carbon matrix.

Recently, thermal decomposition of metal-organic frameworks (MOFs) or porous coordination polymers (PCPs) has been demonstrated as a facile route to synthesize hybrid NPCs. MOFs may be microporous materials synthesized by assembling metal ions with organic ligands in appropriate solvents. The crystalline structures of MOFs may provide large internal surface area, extremely high porosity, tunable porosity, and tailored chemical properties. Utilizing MOFs with various functional metal species may provide a great opportunity to develop new types of carbon-based nanoporous composites with promising applications. For example, via a one-step carbonization of zeolitic imidazolate framework-67 (ZIF-67) crystals, research groups developed nanoporous carbon particles with well dispersed magnetic cobalt, which exhibited an excellent adsorption performance towards organic dye in pollutant water and could be separated by applying an external magnetic field. Other researchers reported that synthesized Co-doped zinc oxide-carbon core-shell composite nanoparticles via carbonization of Co-MOF-5 crystals demonstrated their suitability as high performance anode material for lithium ion batteries with a reversible capacity of 725 mA h $g^{-1}$ up to the $50^{th}$ cycle at a current density of 100 mA $g^{-1}$. Moreover, Al-PCP-derived highly porous carbon had been examined as a sensing material for toxic aromatic compounds. The fast response and high uptake towards aromatic compounds over the Al-PCP-derived carbon was about 4 times higher than commercial active carbon. This may be due to the presence of graphitic $sp^2$-hybridized carbons. The MOF-derived nanoporous carbons may show excellent properties in adsorption, electrochemical capacitance, sensing, and catalysis due to the unique advantages of (1) high surface area and large pore volume, (2) ordered porous structures and narrow pore size distributions without templating methods, (3) high content and uniform dispersion of metal nanoparticles, (4) well developed graphitic carbon derived from the ordered crystal structure, (5) tunable compositions and sizes, and (6) scalable fabrication process.

In previous works, MOF derived carbon materials tend to be fabricated as bulk porous particles via direct carbonization of MOF crystals, and difficulties in handling may arise for certain applications with the overall performance and structural integrity adversely affected. There is thus a challenge to control the dimensions of MOF crystals and to fabricate free-standing, interconnected carbon architectures derived from MOF assemblies.

For applications as electrode materials in energy storage devices, there is a need to provide for free-standing carbon membranes which may be used directly without adding any conductive agent and binder. This advantageously simplifies the fabrication process. Furthermore, compared to separate carbon particles, the interconnected carbon matrix may provide shorter and more continuous pathways for electron and mass transportation, and thereby enhancing the electrochemical performance of the electrode. Accordingly, there is a need to provide for a method that leads to such advantages and ameliorates one or more of the limitations as mentioned above.

There is also a need to provide for a fibrous structure incorporated with metal nanoparticles, which not only demonstrates the above benefits but can also ameliorate one or more of the above limitations as mentioned above.

SUMMARY

In one aspect, there is a method of fabricating a metal-carbon fibrous structure comprising the steps of: (a) forming a fibrous support structure comprising composite nanocrystals and polymeric fibers, wherein each of the composite nanocrystals comprises metal ions connected by organic ligands; (b) growing the composite nanocrystals on the fibrous support structure; and (c) subjecting the fibrous support structure of step (b) to carbonization to form the metal-carbon fibrous structure, wherein the metal-carbon fibrous structure comprises metal nanoparticles derived from the composite nanocrystals.

In another aspect, there is a metal-carbon fibrous structure comprising carbon based fibers arranged to form a porous network and the carbon based fibers are doped with metal nanoparticles, wherein the carbon based fibers have surfaces which comprise graphitic carbon.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the present disclosure are described with reference to the following drawings, in which:

FIG. 1a shows an electrospinning setup.

FIG. 1b shows a MOF embedded electrospun fibrous mat.

FIG. 1c shows fibers (in the form of a fibrous mat) soaked in a solution of metal salt precursor (left picture) followed by the slow addition of organic linker solution via a syringe (right picture).

FIG. 1d shows a step of secondary growth of MOF crystals on the fibers under a mild condition of 60° C. within a short duration of 1 hour to 3 hours.

FIG. 1e shows one of the repeated steps of washing the fibrous mat of FIG. 1d.

FIG. 1f shows a retrieved MOF fibrous mat of FIG. 1e.

FIG. 1g shows a dried and carbonized MOF based carbon fibrous mat.

FIG. 2b shows the MOF nanocrystals embedded on the fibers. The MOF nanocrystals are located inside the fibers and are also partially exposed on the surface of fibers.

FIG. 7a also shows how the fiber surfaces are doped with metal nanoparticles as represented by the darker shades.

FIG. 7b also shows how the fiber surfaces are doped with metal nanoparticles as represented by the darker shades.

FIG. 7c shows the boundary where the graphitic carbon is located.

DETAILED DESCRIPTION

Figure 1C:
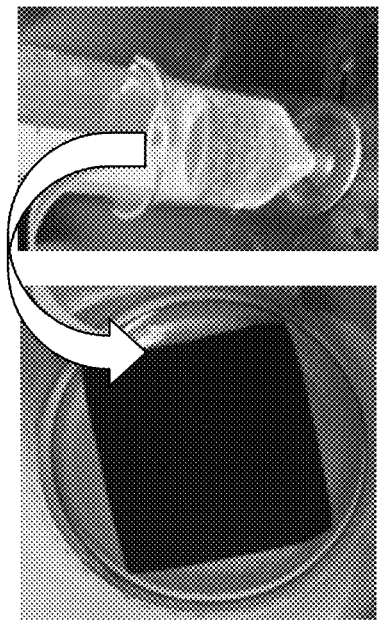
FIG. 1a to FIG. 1g show a schematic diagram depicting the fabrication process of freestanding MOF derived carbon fibrous mats.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and changes may be made without departing from the scope of the invention. The various embodiments are not necessarily mutually exclusive, as some embodiments can be combined with one or more other embodiments to form new embodiments.

As mentioned above, there is a need to provide for a method and a fibrous structure incorporated with metal nanoparticles, both of which not only ameliorate one or more of the above drawbacks but also possess the desirable traits as disclosed above. With this in mind, the inventors have come to discover that electrospinning can be used to make carbonized fibrous structure incorporated with metal nanoparticles having the abovementioned advantages. The method of generating carbonized fibrous structure via electrospinning as disclosed herein also provides more flexible in its application and processing compared to bulk synthesis of carbon particles.

Electrospinning may be a straightforward and versatile technique for generating continuous nanofibers from solutions of polymers or polymers blends. This approach may be capable of producing nanofibers with most materials (e.g. organic, inorganic or hybrid organic-inorganic), thereby affording various fibers with the desired composition and surface properties. In the present disclosure, it is discovered that free-standing MOF membranes using electrospun nanofibrous mats as skeletons can be developed. This can be used for gas separation and detection of explosives. This demonstrates the potential of such nonwoven fiber mats as a new type of porous support in MOF research and applications.

Accordingly, the present disclosure provides a scalable method to fabricate MOF derived free-standing hybrid porous carbon fibrous mats via electrospinning, seed-mediated secondary growth of MOF nanocrystals followed by carbonization. Subsequently, post heat treatment may be applied. The advantageous properties of the resultant nanoporous carbon mats may be demonstrated by application as anode materials for lithium ion batteries.

With the above in mind, embodiments described in the context of the present method are analogously valid for the metal-carbon fibrous structure, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of the present disclosure, the term "organic" refers to carbon based materials. For example, the phrase "organic solvent" or "organic solution" refers to a liquid that is carbon based. The organic solvent or solution may be polar or non-polar.

In the context of the present disclosure, the term "nanoparticle" refers to a particle having one or more dimensions in the range of 1 nm to 100 nm. Meanwhile, the term "nanocrystal" refers to a crystalline particle with at least one dimension measuring less than 1000 nm.

In the context of the present disclosure, the term "nanoporous", or variants such as "nanopore", refers to materials comprising a regular organic or inorganic framework with a porous structure comprising pores that are 100 nm or smaller.

In the context of the present disclosure, the term "micropore", or variants such as "microporous", may also be used to refer to materials with pore sizes of less than 2 nm. In other words, in the context of the present disclosure, a nanopore may be specifically referred to as a micropore if the nanopore is less than 2 nm. Meanwhile, the term "mesoporous", or variants such as "mesopore", refers to materials with pore sizes from 2 to 50 nm.

The word "substantially" does not exclude "completely" e.g. a composition which is "substantially free" from Y may be completely free from Y. Where necessary, the word "substantially" may be omitted from the definition of the invention.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

As used herein, the phrase of the form of "at least one of A or B" may include A or B or both A and B. Correspondingly, the phrase of the form of "at least one of A or B or C", or including further listed items, may include any and all combinations of one or more of the associated listed items.

Unless specified otherwise, the terms "comprising" and "comprise", and grammatical variants thereof, are intended to represent "open" or "inclusive" language such that they include recited elements but also permit inclusion of additional, unrecited elements.

The present disclosure relates to a method of fabricating a metal-carbon fibrous structure. The method may comprise a step of forming a fibrous support structure comprising composite nanocrystals and polymeric fibers, wherein each of the composite nanocrystals comprises metal ions connected by organic ligands, a step of growing the composite nanocrystals on the fibrous support structure, and a step of subjecting the fibrous support structure of the preceding step to carbonization to form the metal-carbon fibrous structure, wherein the metal-carbon fibrous structure comprises metal nanoparticles derived from the composite nanocrystals.

The method may be carried out in the sequence as described above. That is to say, the present method may start with the step of forming, then the step of growing and subsequently the step of subjecting the fibrous support structure to carbonization.

In the context of the present disclosure, the expression "metal-carbon" refers to structures made of carbon based materials incorporating a metal component. The metal components may be in the form of metal nanocrystals, nanoparticles or metal based particles. The metal components may also be in the form of metal oxide based nanoparticles. Meanwhile, the expression "metal-carbon fibrous structure" is meant to refer to the resultant metal-carbon fibrous structure derived from the method described in the present disclosure.

In the present method, the forming step may be carried out by dispersing the composite nanocrystals in a polymer solution to form a suspension, and electrospinning the suspension to form the fibrous support structure comprising the composite nanocrystals and polymeric fibers.

In the present method, the composite nanocrystals may be formed by separately dissolving a metal nitrate (e.g. metal nitrate hexahydrate) or a metal chloride and the organic ligands in a solvent to form two solutions, mixing the two solutions to form a precipitate of the composite nanocrystals, and collecting and drying the precipitate to thereby form the composite nanocrystals. In other words, the synthesis of the composite nanocrystals may involve the preparation of one solution comprising the metal nitrate or metal chloride and another separate solution comprising the organic ligands. The earlier metal nitrate or metal chloride solution may be prepared by dissolving the metal nitrate or metal chloride in a solvent and the latter organic ligands solution may be prepared by dissolving the organic ligands in a separate solvent. The dissolution of the organic ligands in the solvent may be carried out under sonication.

The two distinct solutions may then be mixed and stirred for 30 minutes to 1.5 hours, or 1 hour, at room temperature. The room temperature may be about 20° C. to 30° C. A precipitate of the composite nanocrystals may subsequently form during and/or after mixing.

For formation of the composite nanocrystals, the metal nitrate may comprise any suitable forms of metal nitrate with or without crystal(s) of water. The metal nitrate may be a metal nitrate hexahydrate. The metal nitrate may comprise or consist of cobalt nitrate, iron nitrate or zinc nitrate. For example, the metal nitrate may comprise or consist of cobalt nitrate hexahydrate, iron nitrate hexahydrate or zinc nitrate hexahydrate. Meanwhile, the metal chloride may comprise or consist of cobalt chloride, iron chloride or zinc chloride. Accordingly, the metal component of the materials used herein or resulting products may take on various valencies or just one form of valency. To illustrate this point, the iron in iron chloride may be iron (II) and/or iron (III), and such variations may apply to the other metal components listed herein.

Independently, the organic ligands may comprise or consist of imidazole based ligands. In various embodiments, the imidazole based ligands may comprise or consist of imidazolate ligands. In various embodiments, the imidazolate ligands may be 2-methylimidazole (Hmim). Meanwhile, the solvent for preparing the two solutions as mentioned above may be an aqueous solvent. The solvent may comprise or consist of water and/or methanol. In various embodiments, the aqueous solvent may be water. The water may be deionized or distilled water.

The choice of solvent may modify the evolution of the reaction, altering the crystallization rates and nanocrystal sizes. The hydrogen bond donating ability of the solvent tends to be the main factor that governs these effects. Using aqueous solvent may accelerate crystallization of the ZIF-67 MOF nanocrystals.

Ultimately, to obtain the composite nanocrystals, the precipitate may be collected and dried in vacuum for 12 hours to 24 hours at 40° C. to 100° C. For example, the precipitate may be collected and dried for 24 hours at 80° C. The collection may be carried out by centrifuging and then washing with water, followed by washing with an alcohol (e.g. methanol) for 3 times. This washing procedure may be carried out to wash off unreacted reactants or precursors to prevent further growth or contamination. The usage of methanol helps with easy removal of excess ligands.

The precipitate before or after collection may be a purple coloured precipitate. The colour of the precipitate may depend on the metal component of the starting materials used to form the composite nanocrystals.

In the context of the present disclosure, the composite nanocrystals may be referred to as metal-organic frameworks (MOFs), MOF crystals or MOF nanocrystals. MOFs may be compounds comprising metal ions or clusters of metal ions coordinated or connected to organic ligands by coordinate bond(s). The metal ions or clusters of metal ions may also be connected by the organic ligands via coordinate bond(s). MOFs may comprise voids and hence may be porous. Hence, MOFs or the composite nanocrystals as referred to in the present disclosure may comprise two main components, which are the metal ions or clusters of metal ions and an organic unit. The organic units may comprise or consist of mono-, di-, tri-, or tetravalent organic ligands. The choice of metal and the ligand may dictate the structure and hence properties of the MOF. For example, the metal's coordination preference may influence the size and shape of pores by dictating how many ligands can bind to the metal and in which orientation. Hence, the properties of MOFs may not be the same. This implies it is not possible to predict the structure and/or properties of one MOFs from another or even from the starting materials used to form MOFs.

In the present disclosure, the expression "composite nanocrystal" is used to refer to MOF nanocrystals and not the resultant metal nanoparticles that have undergone carbonization. The resultant metal nanoparticles that have undergone carbonization are structurally distinct from the MOF composite nanocrystals that are used in the forming and growing steps. Nevertheless, the resultant metal nanoparticles may be derived from the composite nanocrystals.

In the present disclosure, the composite nanocrystals may comprise zeolitic imidazolate frameworks (ZIFs) crystals. In various embodiments, the composite nanocrystals may comprise zeolitic imidazolate framework-67 (ZIF-67) crystals. ZIF may be considered a class of metal-organic frameworks that may be topologically isomorphic with zeolites. This does not mean that the ZIF crystals comprise components of zeolites. Instead, the ZIFs may be composed of tetrahedrally coordinated transition metal ions (e.g. Co) connected by imidazolate ligands. ZIFs may have zeolite-like topologies. The ZIF crystals may be nanocrystals.

In the forming step of the fibrous support structure, the polymer solution may be formed by dissolving a polymer in an organic solvent at 50° C. to 80° C. for 0.5 hours to 2 hours. For example, the dissolution may be carried out at 60° C. for 0.5 hours.

The polymer may be selected from the group consisting of polyacrylonitrile, phenolic resins, polypyrrole, polystyrene, polymethylacrylonitrile, polyaromatic hydrocarbons, biomass-derived polymers and their combination thereof. In various embodiments, the polymer may comprise or consist of polyacrylonitrile (PAN). PAN may be advantageously selected because of its mechanical strength to form freestanding fibrous structure or fibrous support structure or the electrospun fibers, which may be further converted to carbon fibers. The expression "free-standing", in the context of the present disclosure, means that no templates or other structures are required to support the electronspun fibers, fibrous support structure or even the resultant fibrous structure.

Meanwhile, an organic solvent may be needed to dissolve the polymer to form the polymer solution. In various embodiments, the organic solvent may comprise or consist dimethylformamide (DMF). The dissolution may be carried out with stirring at temperatures higher than room temperatures to accelerate dissolution of the polymer in the organic solvent. The polymer solution may be cooled to room temperature before further use.

In various embodiments, the weight ratio of the composite nanocrystals to the polymer may be in the range 2:8 to 6:4, 2:8 to 5:5, 3:7 to 6:4, 3:7 to 5:5, 3:6 to 5:5, 3:5 to 5:5, 4:5 to 5:5, 3:7 to 4:5, 3:6 to 4:5, 3:5 to 5:5 or any other ratio as specified within these ranges. With respect to these ratios, the polymer referred to is the polymer used in the solution for electrospinning. In various instances, the ratio may be 3:7 to 5:5. In various embodiments, the composite nanocrystals and the polymer may have a weight ratio of 2:8 to 6:4. Advantageously, the weight ratios as disclosed above help to form well-defined electrospun MOF-impregnated fibrous support structure, electrospun fibers or the fibrous membrane with sufficient nucleation sites for growth of the MOF crystals (i.e. the composite nanocrystals) in the growing step of the present method. This step may be called a secondary growth step because this step is used to grow the MOF composite nanocrystals formed on the fibrous support structure in the earlier forming step.

Once the polymer solution and the composite nanocrystals (i.e. the MOF crystals or nanocrystals) are ready, the latter may be dispersed in the polymer solution to form a suspension. Prior to the dispersion, the composite nanocrystals may be dispersed in an organic solvent (e.g. DMF) under sonication for 5 minutes to 30 minutes, e.g. 10 minutes. This means the composite nanocrystals may be in the form of a solution before contacting the polymer solution. The dispersion of the MOF composite nanocrystals advantageously avoids aggregation of the MOF composite nanocrystals. The solvent used may also depend on the polymer. In this instance, DMF may be suitably used when the polymer solution comprises PAN. Once in the solution form, the composite nanocrystals may be injected into the polymer solution. This suspension may then be left to stir overnight.

Once the electrospinning solution is prepared, the electrospinning may be carried out with an air humidity of not more than 40%, not more than 30%, not more than 20%, not more than 10% or not more than 5%. The electrospinning may be carried out at a voltage of 7.5 kV to 13 kV, or 8.5 kV to 9.5 kV, or any other voltage or voltage range within the specified ranges. The electrospinning may also be carried out with a feeding rate of 0.5 ml/hour to 3 ml/hour, e.g. 0.5 ml/hour. In some instances, the electrospinning may be carried out at a voltage of 8.5 kV to 9.5 kV with a feeding rate of 0.5 ml/hour. The term "hour" or "hours" may also be abbreviated as "h", "hr" or "hrs", where applicable. For instance, when expressing the unit for specific capacity of a battery, the time factor in hours may take the form of "h", i.e. mA h $g^{-1}$. In other instances, durations such as 1 hour, 3 hours may be expressed in the manner as specified and not in any abbreviated forms.

The electrospun fibers may be collected onto a substrate. The substrate may be any suitable substrate, such as but not limited to, an aluminum substrate. The collected fibers may be then left to dry overnight in vacuum at 40° C. to 100° C., e.g. 70° C. The electrospun fibers may be collected in the form of a fibrous support structure. In other words, the fibers may be electrospun into a fibrous support structure.

The electronspun fibers or fibrous support structure formed based on the above described procedures may comprise polymeric fibers. The polymeric fibers may comprise polyacrylonitrile, phenolic resins, polypyrrole, polystyrene, polymethylacrylonitrile, polyaromatic hydrocarbons, biomass-derived polymers or their combination thereof. In various embodiments, the polymeric fibers may comprise or consist of polyacrylonitrile for the advantage as mentioned above.

As discussed earlier, the composite nanocrystals (i.e. the MOF crystals) prepared according to the present method, particularly the procedures as described above, may comprise metal ions or clusters of metal ions. The metal ions may comprise or consist of cobalt, iron or zinc ions. The cobalt ions may be $Co^{2+}$ or $Co^{3+}$. The iron ions may be $Fe^{2+}$ or $Fe^{3+}$. The zinc ions may be $Zn^{2+}$.

In the next step of the present method, the composite nanocrystals seeded on the polymeric fibers may be grown. The composite nanocrystals may also be embedded, impregnated or doped in the polymeric fibers forming the fibrous support structure in addition to being partially exposed at the surface of the fibers and/or located on the surface of the fibers. In the present disclosure, the term "doped" or "dotted" may be used interchangeably to cover one or both configurations as mentioned above i.e. the location or position of where the composite nanocrystals or particles (e.g. the metal nanoparticles) may be located with respect to the fibers (e.g. the polymeric fibers or carbonized fibers). This step may be called a seed-mediated growth stage in the present disclosure. The fibrous support structure may be peeled off from the substrate e.g. aluminum substrate to use for the growing step.

In the present method, the growing step may be carried out by contacting the fibrous support structure with an organic solution comprising a metal precursor and an organic linker to form a mixture, and incubating the mixture to grow the MOF composite nanocrystals. In other words, the growing step serves to grow the MOF composite nanocrystals already formed on the fibrous support structure during the earlier forming step. The size range of the MOF seeds formed before the growing step and the MOF composite nanocrystals grown on the fibers may be 100 nm to 300 nm.

The organic solution may comprise methanol. Advantageously, methanol may be used in various instances because it may dissolve the reactants and may be easily removed. Meanwhile, according to various embodiments, the metal precursor may comprise a metal nitrate or metal chloride. The metal nitrate may be a metal nitrate with or without crystal(s) of water. The metal precursor may comprise cobalt nitrate, iron nitrate, zinc nitrate, cobalt chloride, iron chloride or zinc chloride. As a non-limiting example, the metal precursor may comprise cobalt nitrate hexahydrate, iron nitrate hexahydrate, zinc nitrate hexahydrate, cobalt chloride, iron chloride or zinc chloride. The metal precursor may also comprise a combination of any of the specified or suitable precursors. The metal precursor used for mediated growth may be identical to or may not need to have the same metal ions of the MOF seed composite nanocrystals.

Independently, the organic linker used may or may not comprise the same ligands used in forming the MOF composite nanocrystals as described above. In various instances, the organic linker may comprise an imidazole based linker. The imidazole based linker may comprise or consist of Hmim.

The contacting may be carried out by immersing the fibrous support structure into the organic solution for incubation. The incubation may occur at 40° C. to 80° C. for 1 hour to 3 hours, e.g. 60° C. for 1 hour to 3 hours. This incubation step allows the composite nanocrystals doped to grow into larger nanocrystals.

After the mediated growth step, the fibrous support structure may be dried to before carbonization. In the present method, the carbonization may be carried out in an inert environment and at a temperature of 600° C. to 1000° C. for 2 hours to 3 hours, e.g. 750° C. for 3 hours. The inert environment may comprise or consist argon, nitrogen or any other suitable inert gases. In the context of the present disclosure, carbonization may be carried out to convert an organic material into a carbon-based residue via pyrolysis.

Based on the procedures as described above for the present method, the metal-carbon fibrous structure may comprise carbon and cobalt, carbon and iron, or carbon and zinc. The metal component of the resultant metal-carbon fibrous structure produced based on the method as disclosed herein may depend on the metal ions present in the MOF composite nanocrystals used in the forming step and/or those of the metal precursors. For example, if the MOF composite nanocrystals are formed from zinc components and the metal precursor is a zinc based precursor, then the resultant metal-carbon fibrous structure is a zinc-carbon fibrous structure. In another example, if the MOF composite nanocrystals are formed from cobalt components and the metal precursor is an iron based precursor, then the resultant metal-carbon fibrous structure may comprise cobalt and iron as the metal component.

The present method may further comprise a step of calcinating the metal-carbon fibrous structure to yield a metal oxide-carbon fibrous structure. The calcinating may be carried out at 200° C. to 350° C., e.g. 300° C. for 1 hour. The calcinating step may be carried out in air.

The calcination may be used to convert the metal component (e.g. the metal nanoparticles) of the carbonized fibrous structure to a metal oxide so that it may be used as an anode material, for instance, in lithium ion batteries. The metal oxide-carbon fibrous structure may comprise $Co_3O_4$ and carbon, ZnO and carbon, $Fe_2O_3$ and/or $Fe_3O_4$ and carbon.

As can be seen from the above procedures described, the present method may be carried out without using any templates. This means that no additional support structures may be used to form the resultant free-standing metal-carbon fibrous structure other than the use of the electrospun fibers itself.

In the present disclosure, there may also be a metal-carbon fibrous structure comprising carbon based fibers arranged to form a porous network and the carbon based fibers are doped with metal nanoparticles, wherein the carbon based fibers have surfaces which comprise graphitic carbon. The metal-carbon fibrous structure may be in the form of a fibrous mat or membrane.

In various embodiments, the carbon based fibers may comprise hollow porous carbon nanocages arranged along a single dimension to form the carbon based fibers. The carbon based fibers may comprise a diameter in the range of 300 nm to 1000 nm, 300 nm to 550 nm, 550 nm to 1000 nm, 450 nm to 550 nm, 500 nm to 550 nm, 450 nm to 500 nm or any other diameter or ranges as specified within these ranges. The diameter may be taken as the cross-section of the fiber. The carbon nanocages or walls of the carbon nanocages may be doped with the metal nanoparticles. The walls of the carbon nanocages may be used to form the walls of the fibers making up the fibrous structure.

In various embodiments, the resultant metal nanoparticles doped on the fibers of the fibrous structure may have a size of 5 nm to 50 nm or other size within this specified range. For example, the resultant metal nanoparticles may be around 10 nm. The metal nanoparticles may comprise cobalt, iron or zinc nanoparticles. The iron may be iron (II) or iron (III).

As disclosed in the method embodiments, the size of the MOF seeds and MOF composite nanocrystals grown on the fibers may be similar in the range of 100 nm to 300 nm or 100 nm to 200 nm. The difference in size between the MOF composite nanocrystals and the resultant carbonized metal nanoparticles may be because carbonization is performed at a temperature much higher than the decomposition temperature of the MOF composite nanocrystals. Further, all organic components would have been decomposed by carbonization. The MOF composite nanocrystals may also have been converted to nanocages doped with metal nanoparticles.

The metal content of the metal-carbon fibrous structure may be up to 50 wt %, up to 40 wt %, up to 30 wt %, up to 20 wt % etc. For example, the metal content may be up to 24.6 wt %. The wt % may be based on the weight of the resultant metal-carbon fibrous structure.

In various embodiments, the metal-carbon fibrous structure may be further calcined to form a metal oxide-carbon fibrous structure. The metal oxide-carbon fibrous structure may comprise $Co_3O_4$ and carbon, ZnO and carbon, $Fe_2O_3$ and/or $Fe_3O_4$ and carbon. In the present disclosure, the resultant fibrous structure before calcination may also be called the carbon fibrous structure because the polymeric fibers is likely to be thermally converted to carbon after carbonization.

In summary, the present disclosure relates to a method of preparing free-standing hybrid porous carbon nanofibrous mats based on MOF materials via electrospinning, seed-mediated secondary growth followed by thermal treatment. The said hybrid porous carbon nanofibers exhibit a unique structure which may be in the form of a 1D assembly of interconnected MOF derived hollow carbon nanocages with high pore volume, hierarchical pore size, well-graphitized carbon wall and high content of metal nanoparticles uniformly dispersed in the carbon matrix.

In the present disclosure, free-standing porous hybrid carbon nanofibrous mats may be first fabricated via direct carbonization of MOF based electrospun fibers. In the preparation of the MOF based electrospun fibrous mats, nanosized (100 nm to 200 nm) MOF crystals may be grown on the support fibers using the seed-mediated procedure as disclosed herein under a mild condition (e.g. 60° C.) and in a short period of time (1 hour to 3 hours). The porous carbon nanofibers may exhibit a unique structure as disclosed above i.e. the 1D assembly of interconnected hollow carbon nanocages derived from MOF crystals. The porous carbon fibrous mats may possess high pore volume and hierarchical pore size which may be fabricated without using any "hard" or "soft" templates. Due to the ordered structure of MOF crystals, the derived porous carbon nanofibers may possess high proportion of graphitized carbon and rich content of fine metal particles (about 10 nm) uniformly dispersed in the carbon matrix.

While the methods described above are illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

EXAMPLES

The present disclosure relates to the field of nanostructured hybrid porous carbon materials. Specifically, the present disclosure provides a general and scalable method for preparing MOF-derived free-standing porous carbon nanofibrous mats dotted with fine metal particles via the steps as disclosed above i.e. electrospinning, seed-mediated secondary growth followed by thermal treatment. The resultant hybrid carbon nanofibers may exhibit a unique structure which comprises the one dimensional (1D) assembly of interconnected MOF derived hollow carbon nanocages with high pore volume, hierarchical pore size, well-graphitized carbon wall and high content of metal nanoparticles uniformly dispersed in the carbon matrix. As disclosed herein, the materials can be assessed as anode materials for lithium ion-batteries, where they have exhibited excellent performance with specific capacities up to 1074 mA h $g^{-1}$, good cyclic stability and high rate performance. By using different MOF crystals based on this methodology, these materials may possess great potential for wide applications in energy storage and/or conversion, sensing, gas scavenging, catalysis, water treatment etc.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

Example 1: Preparation of ZIF-67 Nanocrystals 900 mg of cobalt nitrate hexahydrate was dissolved in 3 ml deionized (DI) water. 11000 mg of 2-methylimidazole (Hmim) was then dissolved in 20 ml DI $H_2O$ under sonication. These two solutions were mixed and stirred for 1 hour at room temperature. The resulting purple precipitates were collected by centrifuging, washing with water and then methanol for 3 times, and finally vacuum dried at 80° C. for 24 hours.

Example 2: Preparation of ZIF-67 Embedded Electrospun Fibers 328 mg polyacrylonitrile (PAN, Mw is 150000) was dissolved in 2.0 g of N,N-dimethylformamide (DMF) under magnetic stirring at 60° C. for 0.5 hours and then cooled down to room temperature. 218 mg of the ZIF-67 nanocrystals (100 nm to 200 nm) prepared in example 1 were dispersed in 1.77 g of DMF under sonication for 10 minutes. The suspension was then injected into the above PAN solution under stirring. After continuous stirring overnight, the mixture was placed in a 2 ml plastic syringe fitted with a flap tip 22 G needle and was electrospun using a horizontal electrospinning setup with air humidity lower than 30%. Electrospinning was performed at 8.5 kV to 9.5 kV with a feeding rate of 0.5 ml/hour and the needle tip-to-plate substrate distance was 10 cm. The nanofibers were collected on aluminum foil and dried at 70° C. under vacuum overnight.

Example 3: Growth of ZIF-67 Nanocrystals on The ZIF-67/PAN Electrospun Fibers

The electrospun fibrous mats of example 2 were peeled off the aluminum film and immersed in a solution of 17.6 mg cobalt chloride dissolved in 3 ml methanol. Another 89.5 mg of Hmim was separately dissolved in 3 ml of methanol and added to the former mixture slowly to have uniform growth. Immediate precipitation can be observed based on colour change of pink to dark blue solution. The resultant mixture was then kept in the oven at 60° C. for 1 hour. Upon cooling, the dark blue fibers were washed thoroughly with cold methanol several times and finally dried in the oven at 80° C. for 24 hours.

Example 4: Preparation of the ZIF-67 Derived Hybrid Carbon Fibers

The dried nanofibrous mats were directly carbonized in tube furnace under a flow of argon (150 $cm^3$ STP/min). The temperature was ramped from 25° C. to 750° C. at 5° C. $min^{-1}$ and kept at 750° C. for 3 hours to yield the cobalt/carbon nanofibers based on ZIF-67. This was further converted to $Co_3O_4$/carbon nanofibers via calcination at 300° C. for 1 hour.

Example 5: Characterization

Morphology of the MOF nanocrystals and hybrid nanofibers were observed under JEOL JSM 6700 field emission scanning electron microscope at an accelerating voltage of 5 kV. All samples were coated with a thin gold layer before SEM imaging.

TEM images were obtained with Philips CM300 FEGTEM high resolution transmission electron microscope.

Wide-angle X-ray diffraction (XRD) measurements were performed using a Bruker D8 Discover GADDS X-ray diffraction meter with Cu Kα radiation and Raman spectra were recorded on Jobin Yvon T64000 triple spectrograph micro-Raman system.

The metal content in the resultant hybrid carbon fibers was measured by inductively coupled plasma mass spectrometry (ICP-MS) analysis.

The specific surface area and pore size analysis was measured using a Micromeritics ASAP 2020 system.

Example 6: Electrochemical Performance

Electrochemical performance of the MOF based carbon fibers were evaluated as anode in lithium ion batteries. The free-standing hybrid carbon fibrous mats were punched into discs of 15 mm in diameter and assembled into 2032 button cells in an argon filled glove box with lithium foil, Celgard2325 membrane and 1 M $LiPF_6$ in ethylene carbonate/dimethylcarbonate (1:1 v/v ratio), copper/aluminum foil as the counter electrode, separator, electrolyte and current collectors, respectively. The charge-discharge testing was conducted on NEWARE battery tester at different current densities with a cutoff voltage window of 0.005 V to 3.0 V. Rate capacities were obtained via discharging at 50 mA $g^{-1}$ and charging at various current densities.

Example 7: An Exemplary Non-Limiting Embodiment of the Present Method

An exemplary non-limiting embodiment of the present method as described above and in conjunction with the figures, particularly FIG. 1a to FIG. 1g, follows below.

FIG. 1a to FIG. 1g depict a scalable method as described herein for preparing free-standing MOF derived hybrid porous carbon nanofibrous mats dotted (i.e. doped) with fine metal particles via electrospinning, seed-mediated secondary growth followed by thermal treatment.

Figure 1G:
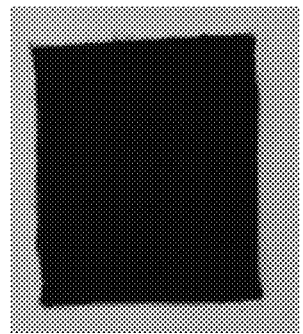
Figure 1F:
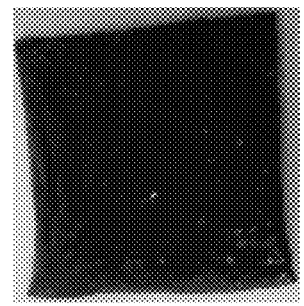
Figure 1B:
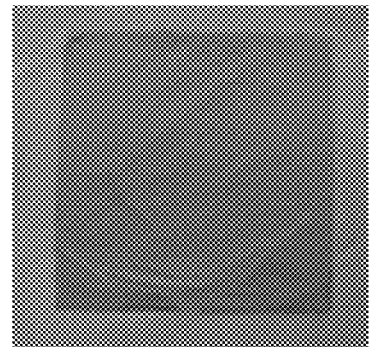
Figure 1E:
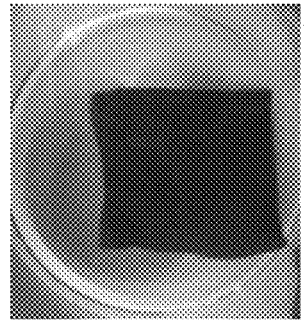
Figure 1A:
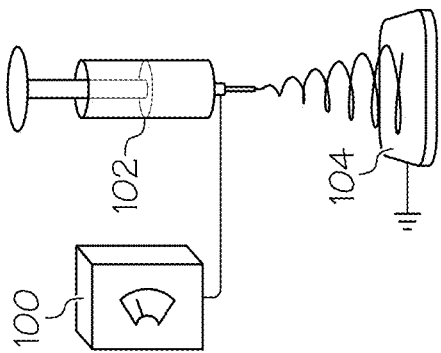
Figure 1D:
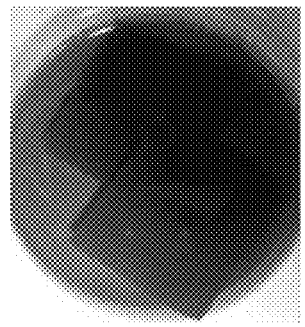

Fiber formation 104 may be first carried out via an electrospinning setup as shown in FIG. 1a. The electrospinning setup has a high voltage source 100 and a syringe where the voltage is applied in proximity of a needle of the syringe. The syringe contains a polymer solution 102 with MOF nanocrystals. The fibers are then formed as a MOF embedded electrospun fibrous mat as shown in FIG. 1b. The mat is then soaked in a solution of the metal salt precursor followed by slowly adding the organic linker solution as shown in both left and right images of FIG. 1c, respectively. The MOF nanocrystals are then allowed to undergo secondary growth under mild conditions (60° C.) with a short duration (e.g. 1 hour to 3 hours) as illustrated in FIG. 1d. The mat is then washed repeatedly with solvent in FIG. 1e.

The MOF based fibrous mat is then retrieved (FIG. 1ƒ, dried and further carbonized to become the MOF based carbon fibrous mat in FIG. 1g.

Example 8: Summarized Details and Results of the Present Method

As shown in FIG. 1a to FIG. 1g, the disclosed MOF derived carbon fibrous mats were fabricated via a three step process which first involves the preparation of MOF embedded electrospun polymer fibers. Continuous seed-mediated growth of MOF nanocrystals on the fibers is then carried out and followed by direct carbonization with or without further heat treatment to yield free-standing hybrid carbon fibrous mats well dispersed with nano-sized metal or metal oxide particles.

One of the polymers used for electrospinning is polyacrylonitrile (PAN) as it generates free-standing nanofibrous mats with good mechanical strength and is commonly used for fabrication of carbon fibers. Other polymers may include, but not limited to, phenolic resins, polypyrrole, polystyrene, polymethylacrylonitrile, polyaromatic hydrocarbons, biomass-derived polymers and the combination thereof.

The MOF nanocrystals used in the method as disclosed herein are according to example 1. The MOF nanocrystals produced are with sizes around 100 nm to 200 nm and the weight ratio of MOF to polymer can be tuned from 3:7 to 5:5 to ensure a well-defined electrospun MOF impregnated fibrous membrane with sufficient nucleation sites for the secondary growth of MOF crystals (see example 2).

The hybrid fibrous mats were then immersed in the solution of metal precursor mixed with organic linkers at elevated temperature for 1 hour to 3 hours to continuously grow MOF nanocrystals on the fibers (see example 3).

The integrated MOF based electrospun fibers were subsequently subjected to direct carbonization under argon above 600° C. to generate free-standing hybrid carbon fibrous mats incorporated with metals, which could be further converted to metal oxides via post heat treatment in the air (see example 4).

Figure 2A:
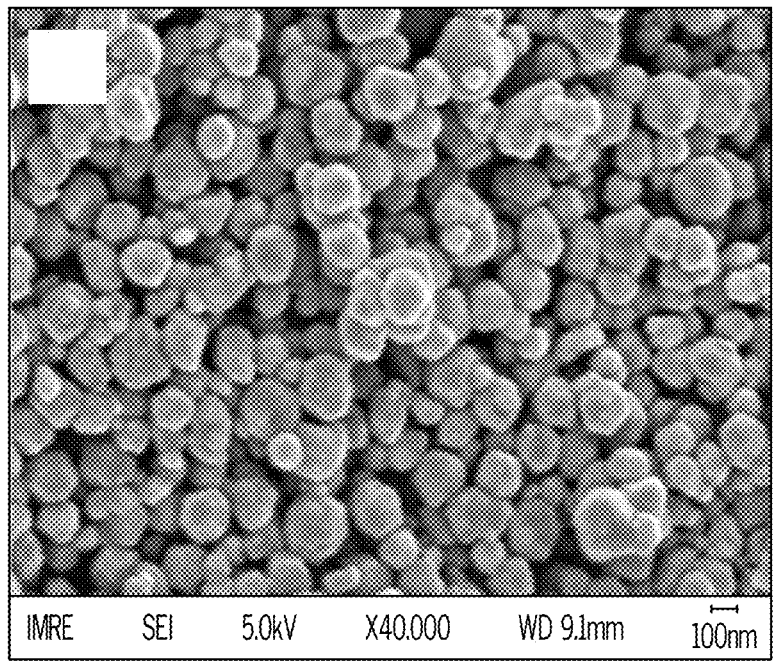
FIG. 2a shows a scanning electron microscopy (SEM) image of zeolitic imidazolate framework-67 (ZIF-67) nanocrystals. Magnification is set at ×40000 and the scale bar represents 100 nm. The ZIF-67 nanocrystals have a size of about 200 nm.
Figure 2B:
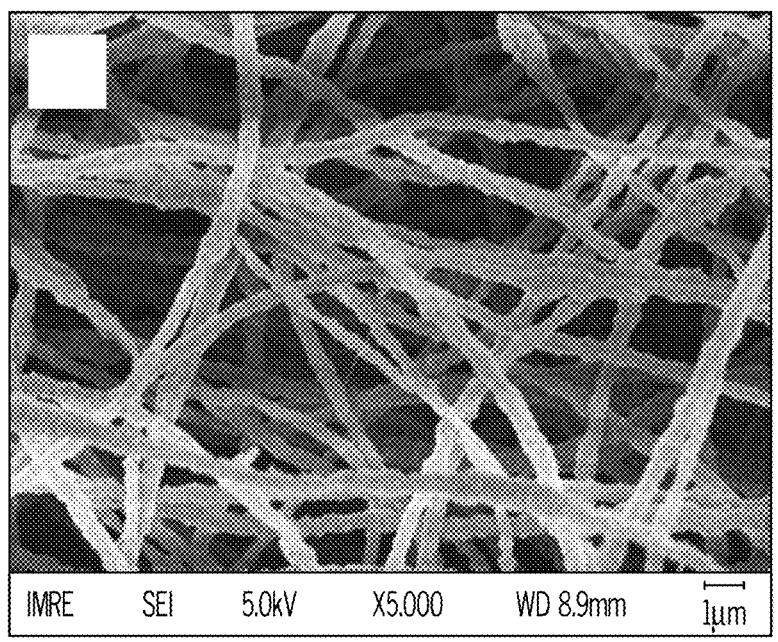
FIG. 2b shows a SEM image of ZIF-67/PAN electrospun fibers. Magnification is set at ×5000 and the scale bar represents 1 μm.

FIG. 2a and FIG. 2b present SEM images of the prepared ZIF-67 nanocrystals with sizes around 200 nm and the corresponding electrospun ZIF-67/PAN fibers. The diameters of the hybrid fibers could be controlled at around 500 nm via adjusting the spinning parameters to impregnate all of the MOF nanocrystals in the fibers, which provide nucleation sites to facilitate the continuous growth of MOF crystals.

Figure 3A:
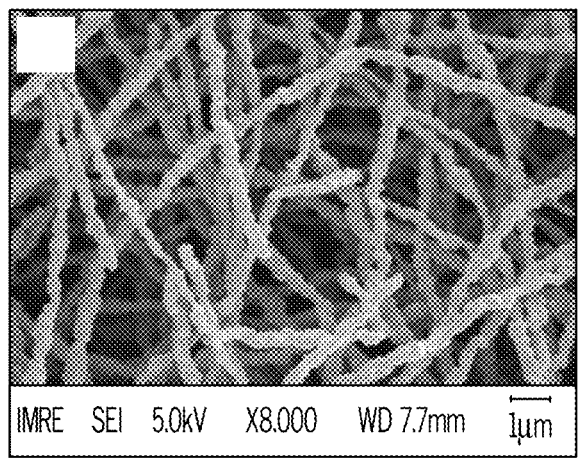
FIG. 3a shows a SEM image of seed-mediated growth of ZIF-67 nanocrystals on ZIF-67/PAN electrospun fibers. Magnification is set at ×8000 and the scale bar represents 1 μm. The ZIF-67 nanocrystals have a size in the range of 100 nm to 200 nm.
Figure 3B:
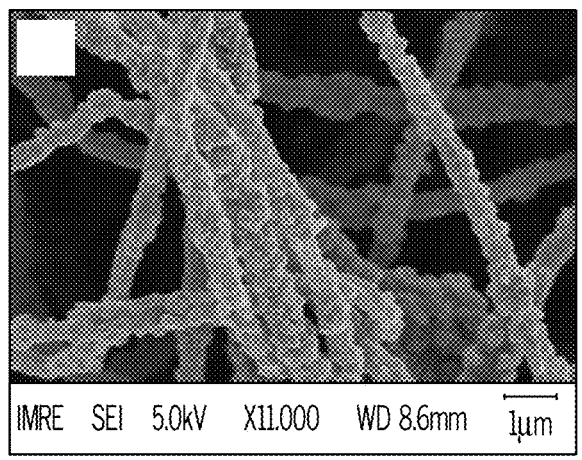
FIG. 3b shows a SEM image of seed-mediated growth of ZIF-67 nanocrystals on ZIF-67/PAN electrospun fibers. Magnification is set at ×11000 and the scale bar represents 1 μm. The ZIF-67 nanocrystals have a size in the range of 100 nm to 200 nm.
Figure 3C:
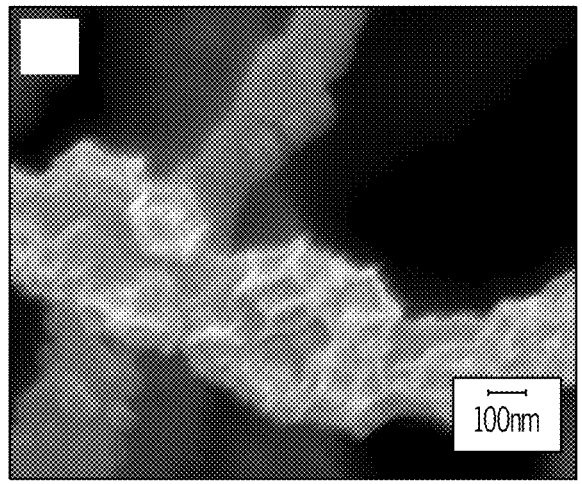
FIG. 3c shows a SEM image of seed-mediated growth of ZIF-67 nanocrystals on ZIF-67/PAN electrospun fibers. Magnification is set at ×50000 and the scale bar represents 100 nm. The ZIF-67 nanocrystals have a size in the range of 100 nm to 200 nm.
Figure 4A:
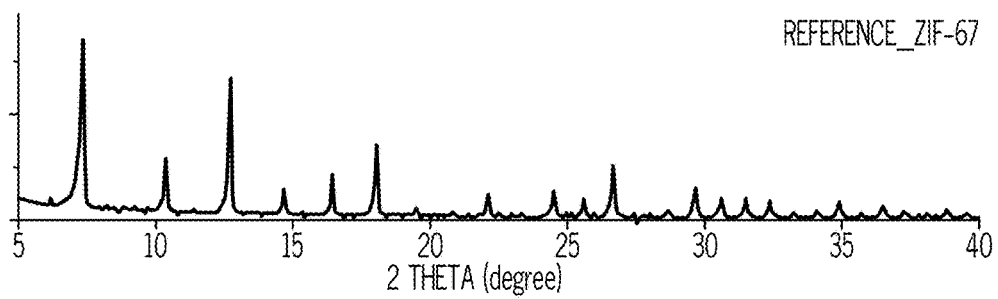
FIG. 4a shows a X-ray powder diffraction (XRD) spectra of pure ZIF-67 material.
Figure 4B:
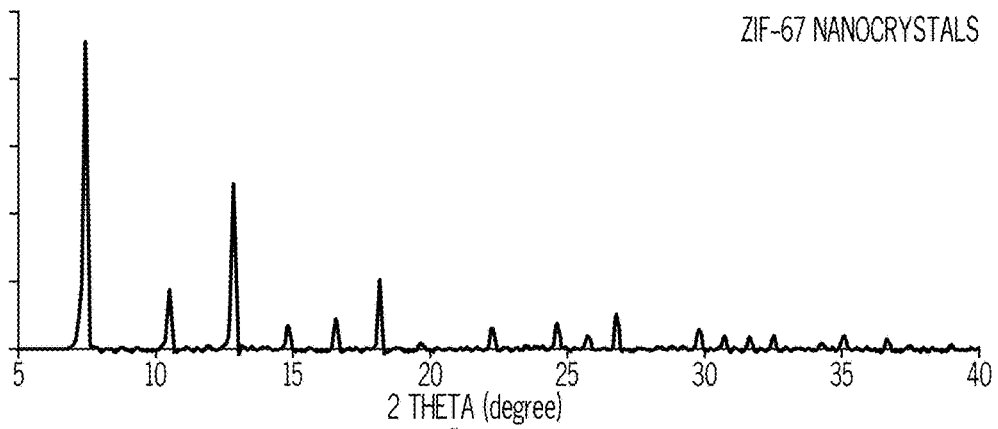
FIG. 4b shows a XRD spectra of ZIF-67 nanocrystals.
Figure 4C:
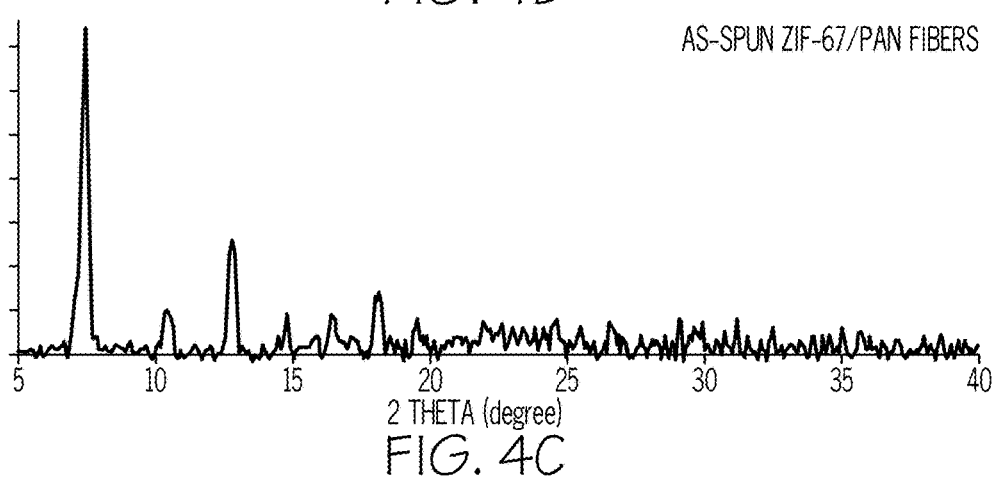
FIG. 4c shows a XRD spectra of as-spun ZIF-67/PAN fibers according to embodiments as disclosed herein.
Figure 4D:
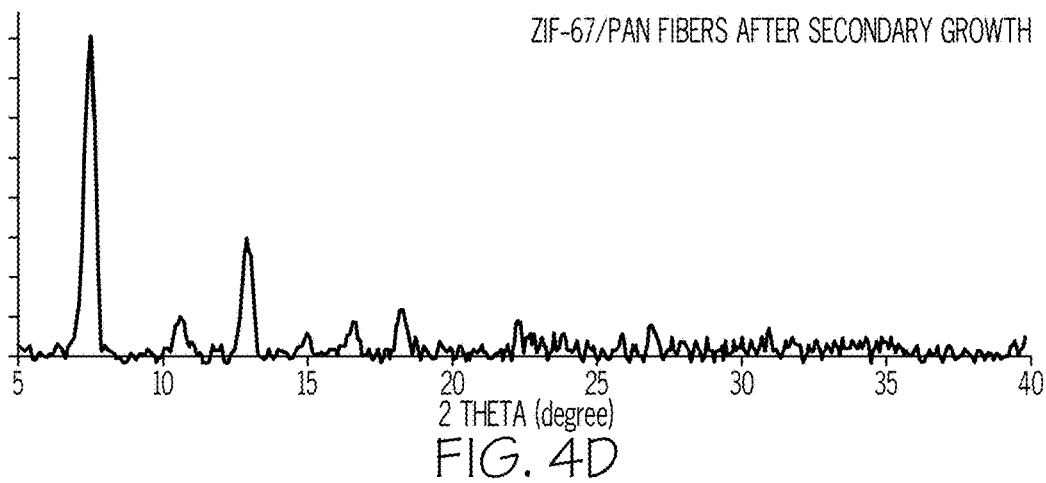
FIG. 4d shows a XRD spectra of ZIF-67/PAN fibers after secondary growth according to embodiments as disclosed herein.

As shown in FIG. 3a to FIG. 3c, after immersion in the solution of cobalt precursor and organic linker for one hour at 60° C., the hybrid electrospun fibers are almost completely covered with ZIF-67 nanocrystals of sizes ranging from 150 nm to 200 nm. The XRD patterns of pure ZIF-67 nanocrystals, as-spun ZIF-67/PAN fibers and ZIF-67/PAN fibers after secondary growth are shown in FIG. 4, which all exhibit the characteristic peaks of the standard ZIF-67 crystals and also clearly demonstrate that the structure of the ZIF-67 nanocrystals remain intact during the electrospinning process and are partially exposed on the fiber surface to act as seeds for the secondary growth.

Figure 5A:
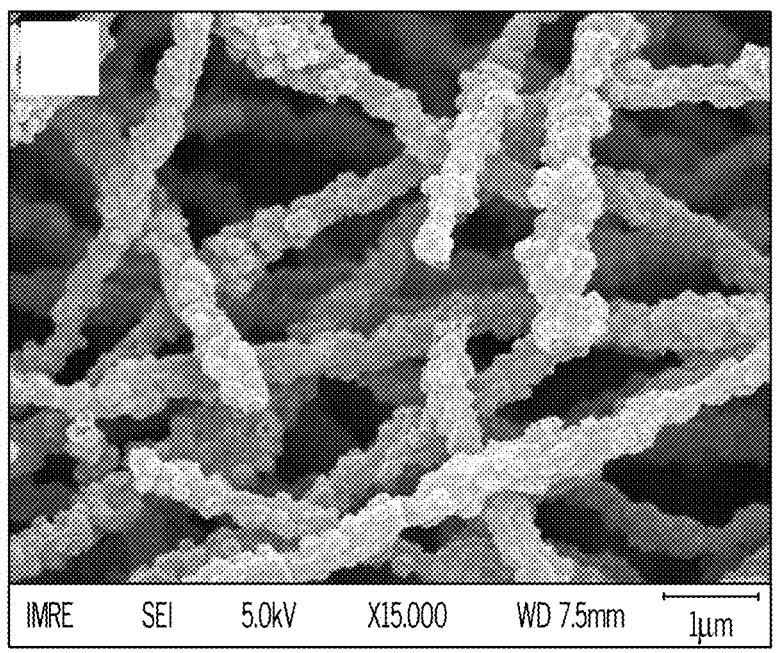
FIG. 5a shows a SEM image of ZIF-67 derived electrospun carbon (i.e. carbonized) nanofibers. Magnification is set at ×15000 and the scale bar represents 1 μm.
Figure 5B:
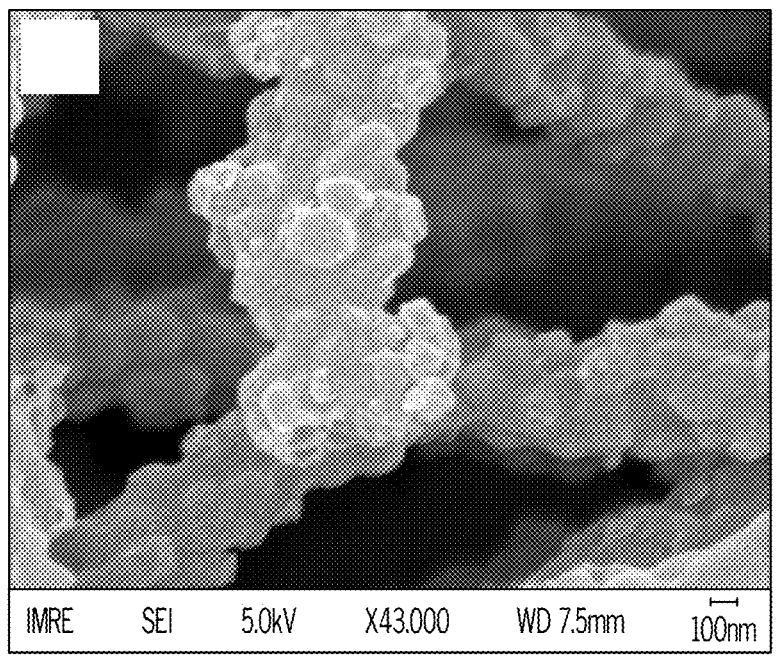
FIG. 5b shows a SEM image of ZIF-67 derived electrospun carbon nanofibers. Magnification is set at ×43000 and the scale bar represents 100 nm.
Figure 6A:
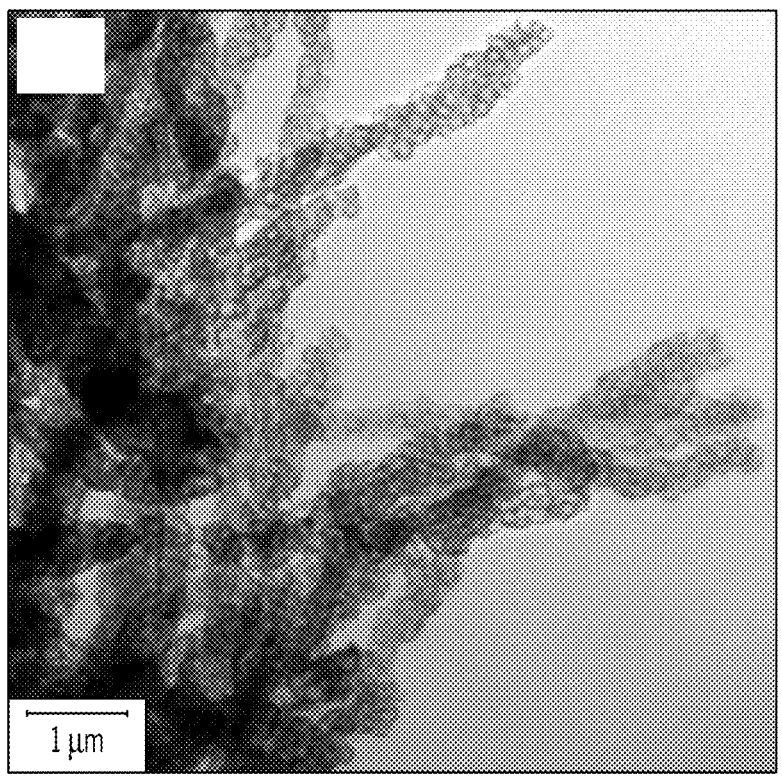
FIG. 6a shows a transmission electron microscopy (TEM) image of ZIF-67 derived carbon (i.e. carbonized) nanofibers. The scale bar represents 1 μm. From FIG. 6a, it can be seen that the nanofibers are composed of interconnected MOF derived hollow carbon nanocages as building blocks in one dimension (1D).
Figure 6B:
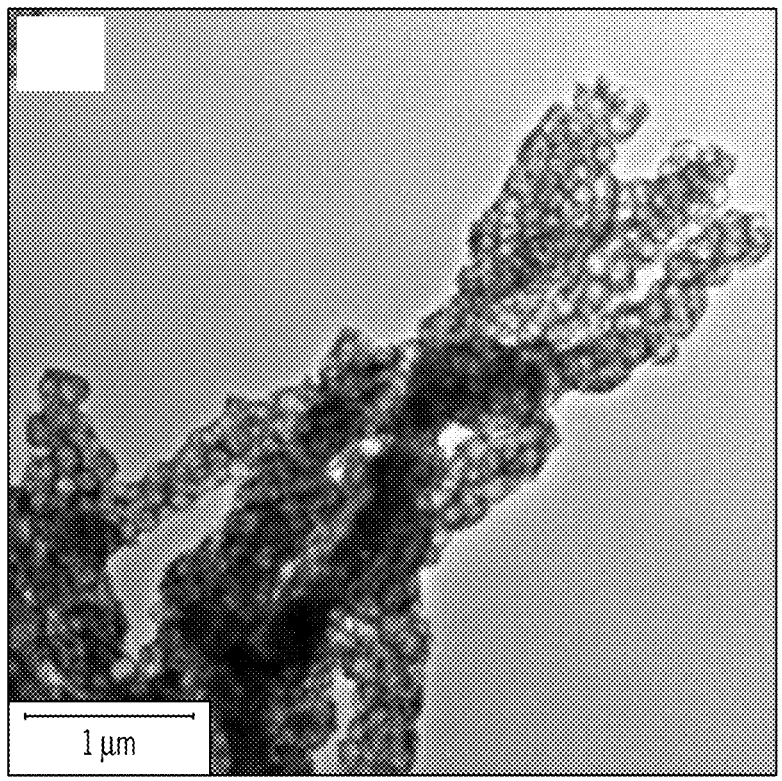
FIG. 6b shows a TEM image of ZIF-67 derived carbon nanofibers. The scale bar represents 1 μm. From FIG. 6b, it can also be seen that the nanofibers are composed of interconnected MOF derived hollow carbon nanocages as building blocks in one dimension (1D).
Figure 7A:
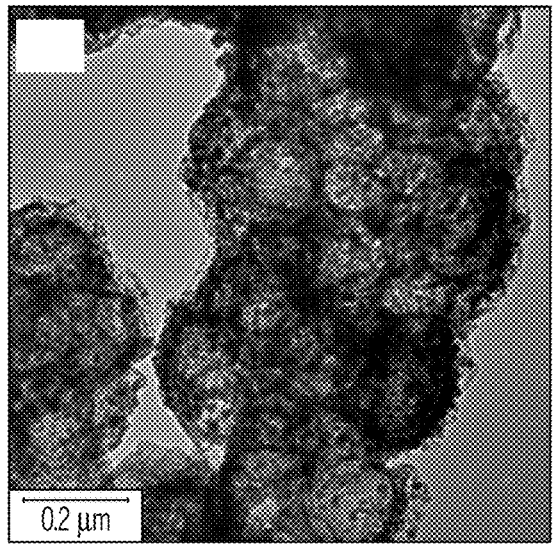
FIG. 7a shows a high resolution TEM image of ZIF-67 derived carbon nanofibers. The scale bar represents 0.2 μm.
Figure 7B:
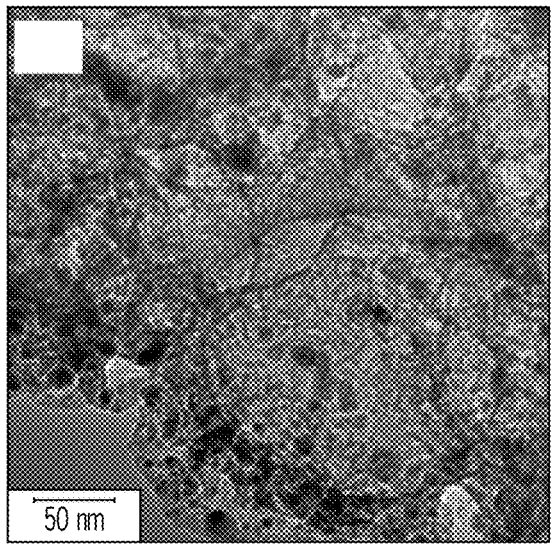
FIG. 7b shows a high resolution TEM image of ZIF-67 derived carbon nanofibers. The scale bar represents 50 nm.
Figure 7C:
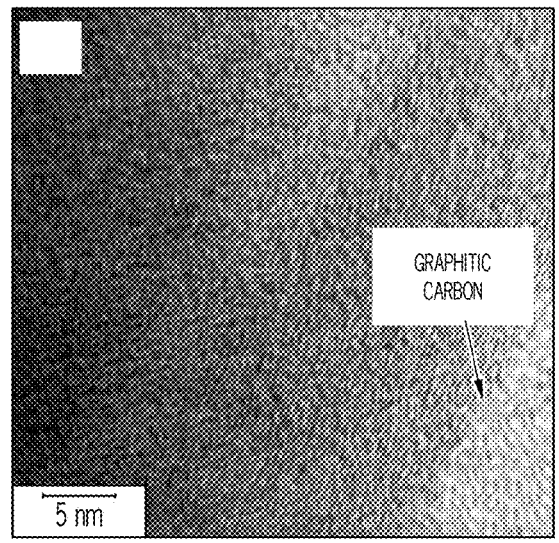
FIG. 7c shows a high resolution TEM image of ZIF-67 derived carbon nanofibers. The scale bar represents 5 nm.
Figure 8:
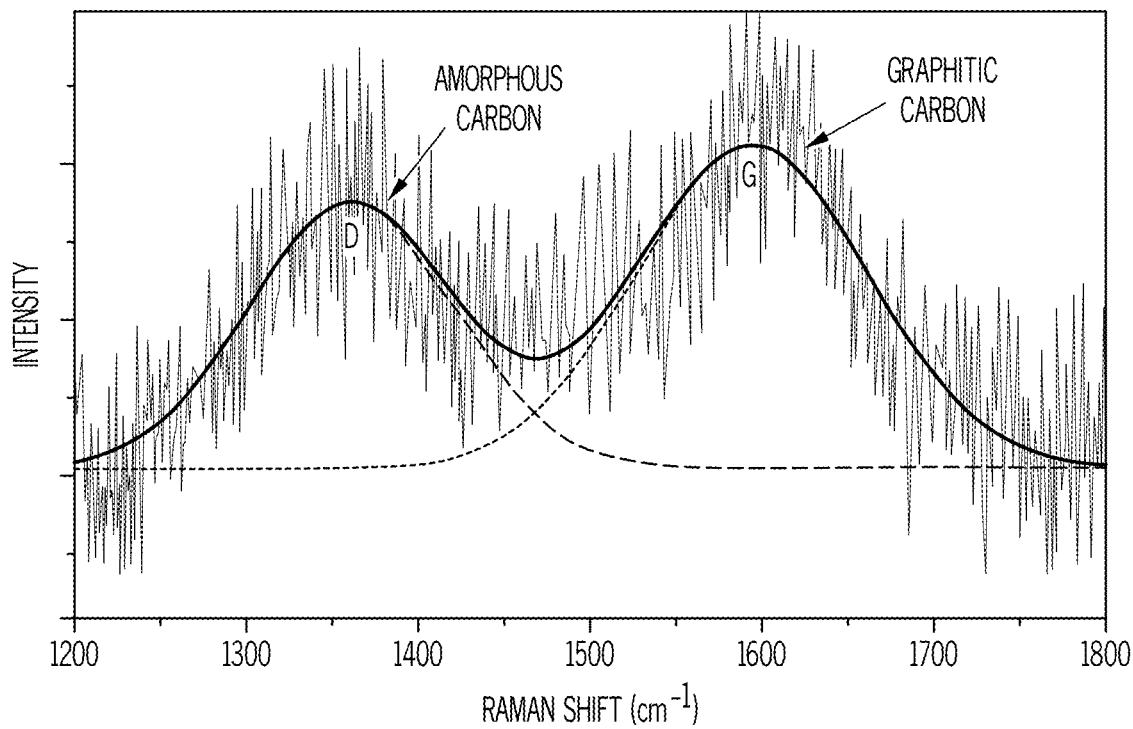
FIG. 8 shows a Raman spectrum of ZIF-67 derived carbon nanofibers. The left and right peaks are the D (amorphous carbon) and G (graphitic carbon) bands, respectively.
Figure 9:
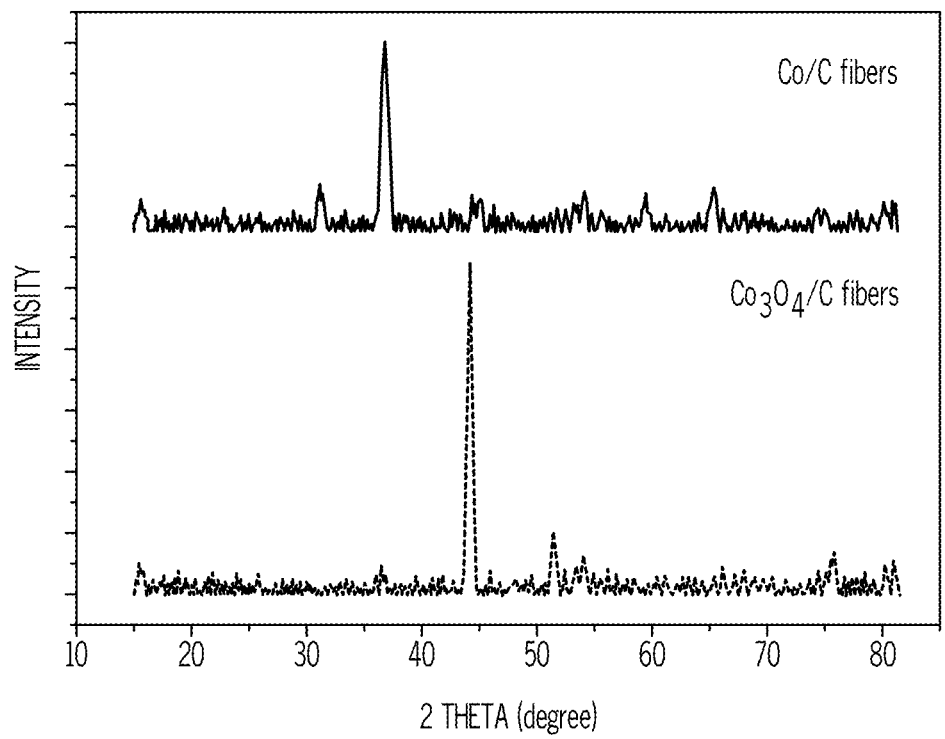
FIG. 9 shows the XRD patterns of Co/C (upper pattern) and $Co_3O_4$/C (lower pattern) fibers derived from ZIF-67.

As shown in FIG. 5, after direct carbonization at 750° C., the ZIF-67 based electrospun fibers can still maintain the free-standing nanofibrous morphology to yield the hybrid cobalt/carbon fibers, as evidenced by their X-ray diffraction (XRD) patterns (FIG. 9). As revealed in the TEM images shown in FIG. 6, these carbon fibers exhibit a porous network structure composed of the MOF derived nano-sized hollow carbon nanocages as building blocks in one dimension (1D). From the high resolution TEM images shown in FIG. 7, the carbon walls are well graphitized and uniformly doped with very fine cobalt nanoparticles with sizes around 10 nm. The content of the metal can reach as high as 24.6 wt % by inductively coupled plasma mass spectrometry (ICP-MS) elemental analysis. The Raman spectrum of the ZIF-67 derived carbon fibers is shown in FIG. 8. The curve that is outlined according to the spectrum represents the sum of the two components responsible for the D and G peaks. The peak intensity ratio of the D band (1350 cm$^{-1}$, disordered carbon) to the G band (1580 cm$^{-1}$, sp$^2$ carbon) is as low as 0.73. This indicates a high proportion of graphitic carbon was formed under the catalysis of cobalt and also due to the ordered crystal structure of the MOF nanoparticles. After post calcination at 300° C. for 1 hour, the porous cobalt/carbon nanofibers was successfully converted to $Co_3O_4$/carbon nanofibers, which is promising for application as anode material for lithium ion batteries.

Figure 10:
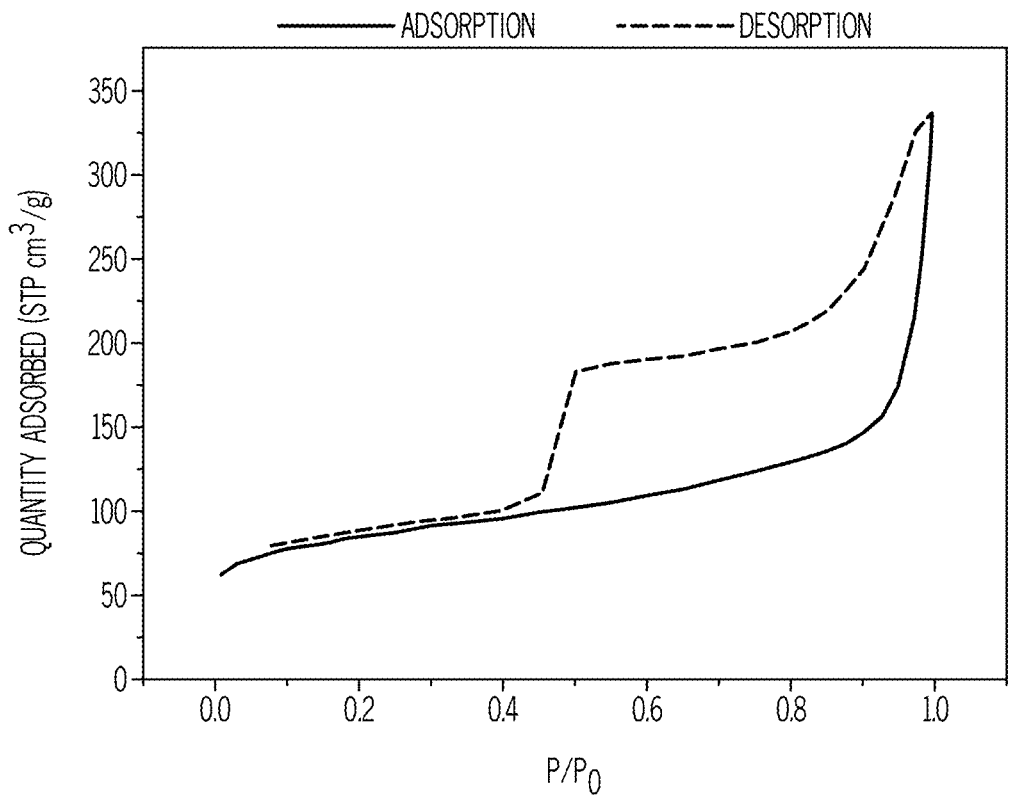
FIG. 10 shows the nitrogen adsorption/desorption isotherms of ZIF-67 derived carbon fibers.
Figure 11:
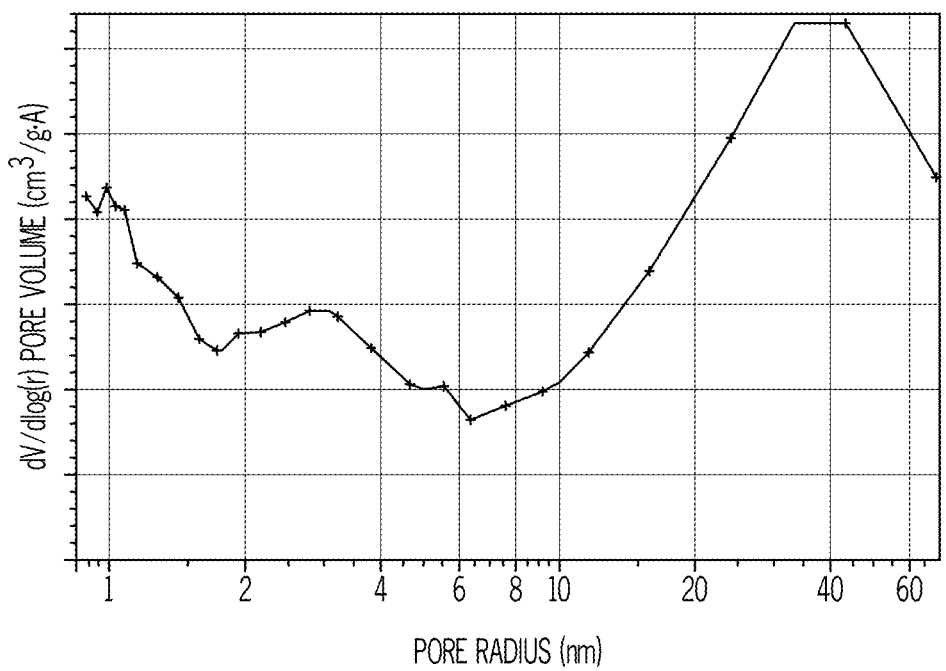
FIG. 11 shows a Barrett-Joyer-Halenda (BJH) pore size distribution of the ZIF-67 derived carbon fibers.

FIG. 10 and FIG. 11 show the $N_2$ adsorption-desorption isotherms and the corresponding BJH pore size distribution curve for the ZIF-67 derived carbon nanofibers, respectively. The material exhibits a type-IV curve with a dramatic hysteresis loop in the range of $P/P_0$ to be 0.4 to 1, which is a characteristic of hollow mesoporous materials.

According to the Barrett-Joyer-Halenda (BJH) model, the ZIF-67 derived carbon nanofibers possess plenty of mesopores with a maximum diameter frequency centered at or near 1 nm, 3 nm and 40 nm. The specific surface area estimated by the Brunauer-Emmett-Teller (BET) method is 257 m$^2$/g with a high total pore volume of 0.485 cm$^3$/g, in which the micropores accounts for 11% with a pore volume of 0.052 cm$^3$/g. The above BET report demonstrates that this kind of nanoporous carbon possesses rich hierarchical micro-mesopores that may bring about plenty of accommodation sites for Lithium ion storage and also provide optimal pathways to facilitate mass transportation, thereby ensuring the high performance in energy storage systems.

Figure 12:
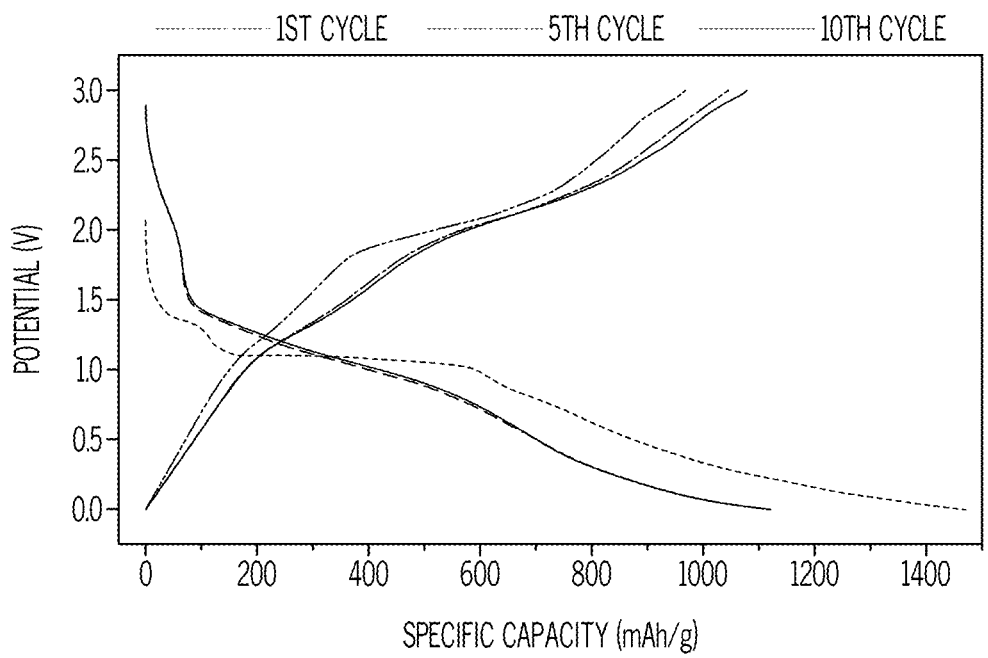
FIG. 12 shows the initial discharge/charge curves of ZIF-67 derived $Co_3O_4$/carbon fibers at a current rate of 50 mA $g^{-1}$ up to the $10^{th}$ cycle.
Figure 13:
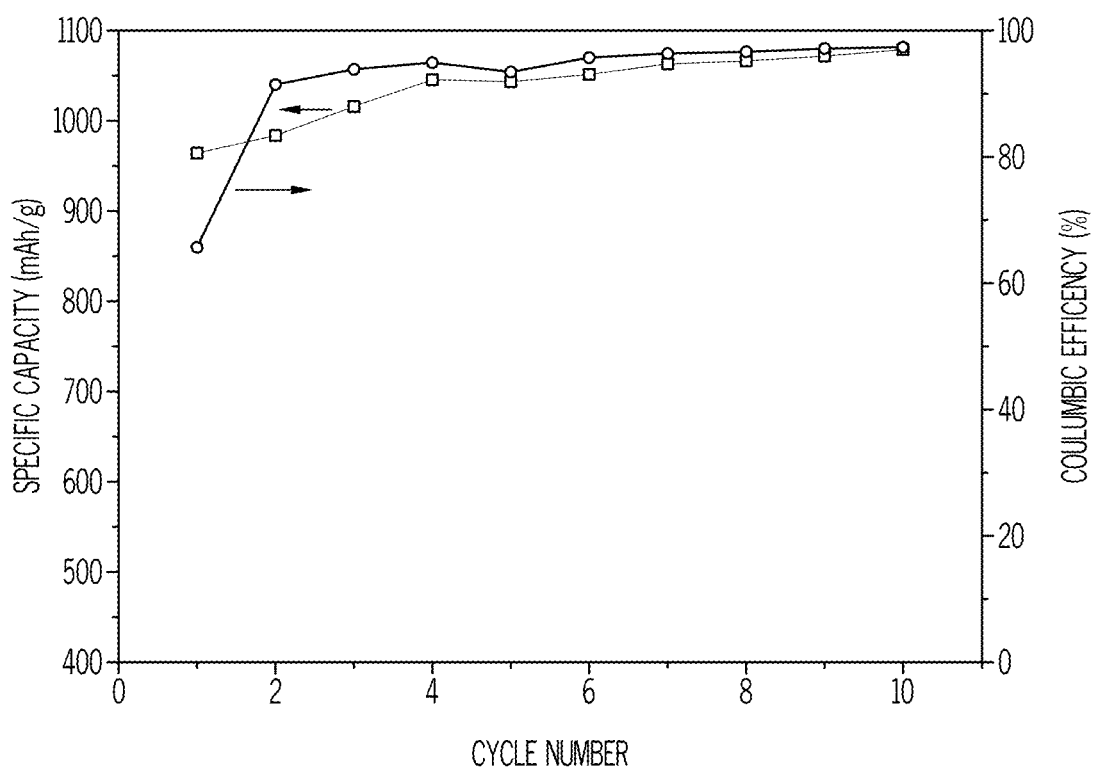
FIG. 13 shows a plot of specific capacity and coulombic efficiency of the first 10 cycles of ZIF-67 derived $Co_3O_4$/carbon fibers at a current rate of 50 mA $g^{-1}$.
Figure 14:
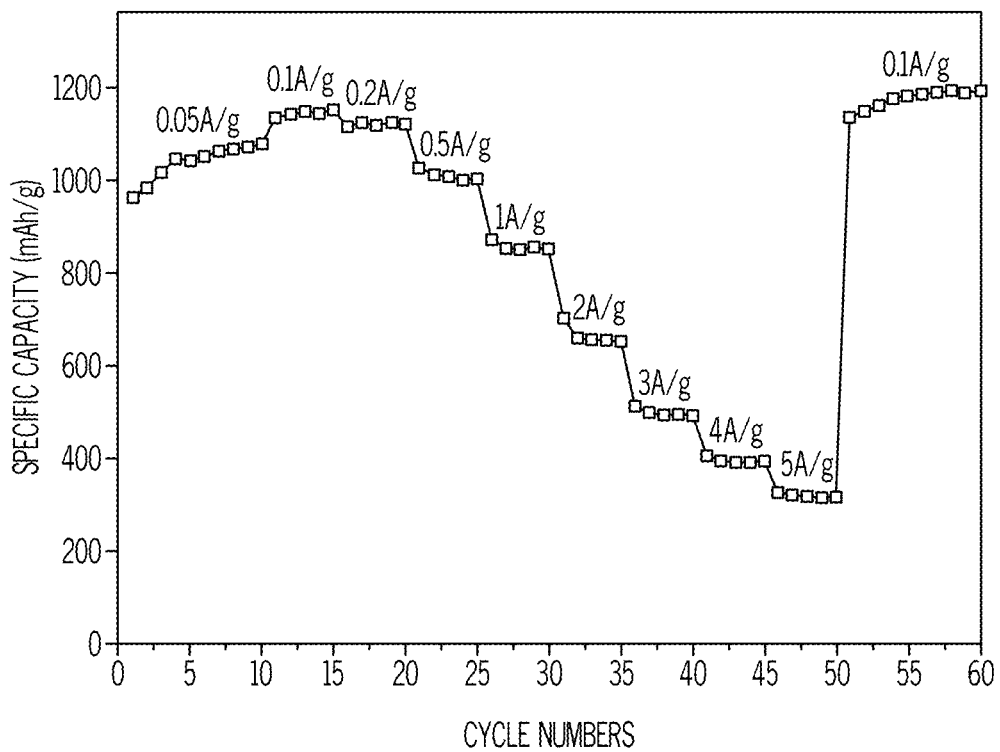
FIG. 14 shows a rate capacity at different current densities for the ZIF-67 derived $Co_3O_4$/carbon fibers.

The electrochemical performance of the ZIF-67 derived porous $Co_3O_4$/carbon fibers was investigated as the anode in Lithium ion batteries. FIG. 12 shows the initial charge/discharge curves of the material at a low current density of 50 mA g$^{-1}$ for the first ten cycles. The material exhibited a high charge capacity (high initial specific capacity) up to 1074 mA h g$^{-1}$ and excellent cyclic stability (FIG. 13). The coulombic efficiency increased from 65.7% to 97.3% in the first ten cycles. Remarkably, this material also shows good performance at high current densities. As shown in FIG. 14, the specific capacity decreases very slowly when increasing the charging currents step by step. Even when the current density is increased from 50 mA g$^{-1}$ to 5 A g$^{-1}$, a specific capacity of 320 mA h g$^{-1}$ is still retained. The rate capacity almost rebounds back to the original value and keeps stable when a low rate of 100 mA g$^{-1}$ was applied again. A high specific capacity of over 800 mA h g$^{-1}$ is attainable at a current density of 1 A g$^{-1}$. The good high rate performance of the carbon spheres can be attributed to the graphitic layers for improving electrical conductivity as well as the quantities of interconnected mesopores which provide short pathways for lithium ion diffusion and electron transportation.

Figure 15:
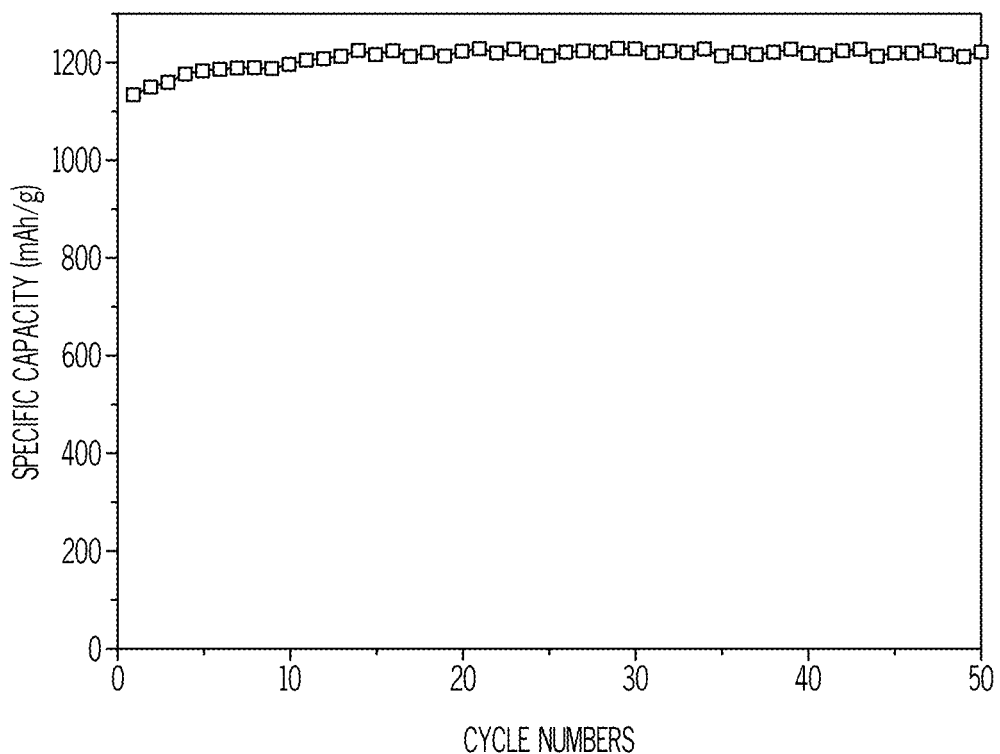
FIG. 15 shows a plot of the cyclic stability evaluated at a current density of 100 mA $g^{-1}$ for 50 cycles based on ZIF-67 derived $Co_3O_4$/carbon fibers.

As shown in FIG. 15, the material displays excellent cyclic stability when evaluated at a current density of 100 mA g$^{-1}$ up to 50 cycles, highlighting the great potential of this material for practical applications.

Example 9: Applications and Utilities

Unlike conventional methods that fabricate MOF derived carbon materials as bulk porous particles, the present method as disclosed herein first obtains free-standing, interconnected carbon architectures derived from MOF assemblies, which have improved structural integrity and convenience in handling and recycling for specific applications.

With inexpensive MOF crystals as building blocks, the present method fabricates porous nanocarbon materials via a straightfoward, template-free and cost effective process, which provides a methodology that can be applied to MOF crystals based on various metals for different applications.

The obtained hybrid porous carbon fibrous mats as disclosed herein have been shown to outperform conventional porous carbon fibrous structure for energy storage. For instance, the present fibrous structure has high reversible specific capacities, good high rate performance and excellent cyclic stability when applied as anode in lithium ion batteries.

Accordingly, the method of the present disclosure can be used to fabricate free-standing hybrid porous carbon nanofibrous mats for a wide range of applications, not only as electrodes in energy storage or conversion systems, but also as substrates for sensing, gas scavenging, catalysis, air and/or water treatment, toxic substance management etc.

The invention claimed is:

1. A metal-carbon fibrous structure comprising carbon based fibers arranged to form a porous network, wherein the carbon based fibers have surfaces which comprise graphitic carbon, wherein the carbon based fibers comprise hollow porous carbon nanocages having walls which define the surfaces of the carbon based fibers, wherein the hollow porous carbon nanocages are doped with metal nanoparticles, and wherein the metal nanoparticles are embedded in and/or partially exposed on the surfaces of the carbon based fibers.

2. The metal-carbon fibrous structure according to claim 1, wherein the hollow porous carbon nanocages are arranged along a single dimension to form the carbon based fibers.

3. The metal-carbon fibrous structure according to claim 1, wherein the carbon based fibers comprise a diameter in the range of 300 nm to 1000 nm.

4. The metal-carbon fibrous structure according to claim 1, wherein the metal nanoparticles have a size of 5 nm to 50 nm.

5. The metal-carbon fibrous structure according to claim 1, wherein the metal nanoparticles comprise cobalt, iron or zinc nanoparticles.

6. The metal-carbon fibrous structure according to claim 1, wherein the metal-carbon fibrous structure comprises a metal content of up to 50 wt %, wherein the wt % is based on the weight of metal-carbon fibrous structure.

7. The metal-carbon fibrous structure according to claim 1, wherein the metal-carbon fibrous structure is further calcined to form a metal oxide-carbon fibrous structure.

8. The metal-carbon fibrous structure according to claim 7, wherein the metal oxide-carbon fibrous structure comprises $Co_3O_4$ and carbon, $ZnO$ and carbon, $Fe_2O_3$ and/or $Fe_3O_4$ and carbon.

* * * * *